United States Patent [19]

Kawasaki

[11] Patent Number: 4,690,191
[45] Date of Patent: Sep. 1, 1987

[54] RADIAL TIRE WITH REINFORCING STEEL CORD

[75] Inventor: Kiyohito Kawasaki, Akigawa, Japan

[73] Assignee: Bridgestone Corporation, Tokyo, Japan

[21] Appl. No.: 810,459

[22] Filed: Dec. 18, 1985

[30] Foreign Application Priority Data

Dec. 21, 1984 [JP] Japan ................................ 59-268540
Jun. 18, 1985 [JP] Japan ............................. 60-90826[U]

[51] Int. Cl.[4] ............................................. B60C 9/18
[52] U.S. Cl. .................................... 152/527; 57/902; 152/451
[58] Field of Search ............... 152/451, 527, 535, 556; 57/210, 212, 213, 237, 902; 428/295

[56] References Cited

U.S. PATENT DOCUMENTS

| | | | |
|---|---|---|---|
| 3,032,963 | 5/1962 | Fenner | 152/527 X |
| 4,158,946 | 6/1979 | Bourgois | 152/451 X |
| 4,161,203 | 7/1979 | Suzuki et al. | 152/527 |
| 4,436,131 | 3/1984 | Yamaguchi | 57/902 X |
| 4,481,996 | 11/1984 | DeBondt et al. | 152/451 |
| 4,488,587 | 12/1984 | Umezawa et al. | 152/451 X |
| 4,572,264 | 2/1986 | Umezawa et al. | 152/451 |
| 4,606,392 | 8/1986 | Weidenhaupt et al. | 152/527 X |

FOREIGN PATENT DOCUMENTS

56-163905 12/1981 Japan ................................. 152/527

OTHER PUBLICATIONS

Research Disclosure, #18441, disclosed anonymously, Aug. 1979, pp. 430-431.

Primary Examiner—Donald E. Czaja
Assistant Examiner—Ramon R. Hoch
Attorney, Agent, or Firm—Sughrue, Mion, Zinn, Macpeak, and Seas

[57] ABSTRACT

A radial tire has a combined reinforcement consisting of a belt composed of at least three piled cord layers with steel cords buried in parallel in rubber in which the cords in each of the layers are set at a relatively small angle with respect to a tire equatorial plane and the cords in at least one pair of the adjacent cord layers are intersectingly arranged at an angle from 15° to 30° and a carcass having cords arranged substantially at right angles with respect to the tire equatorial plane. The steel cords buried in the at least one pair of the cord-intersecting cord layers other than the outermost cord layer have Young's modulus of 6,000 to 16,000 kg/mm$^2$ and a flexural rigidity of 150 to 250 g, and the initial stage elongation (P.L.E.) of the rubberized cords taken out from the tire is not more than 0.2%. A tire reinforcing steel cord of a two layer twisted construction is also disclosed, which cord is composed of a core consisting of from two to four steel filaments and a single sheath consisting of a plurality of the steel filaments surrounding the core in which the steel filaments have a tensile strength of not lower than 260 kg/mm$^2$ and a filament diameter of from 0.32 to 0.42 mm; the twisting direction of the core is reversed to that of the sheath; the twisting angle of the sheath, P2, is $72° \leq P2 \leq 80°$ and the core twisting angle (P1) and the sheath twisting angle P2 meet the relation of $1.0 \leq P1/P2 \leq 1.1$.

7 Claims, 21 Drawing Figures

RADIAL TIRE WITH REINFORCING STEEL CORD

BACKGROUND OF THE INVENTION

1. Field of the Invention

The present invention relates to radial tires and tire reinforcing steel cords used for the radial tires, and more specifically, the invention relates to radial tires for use in trucks and buses and tire reinforcing steel cords used therefor.

2. Related Art Statement

As the radial tires for use in the conventional trucks and buses, there have been used a radial tire body-reinforced by a belt composed of at least three rubberized cloth layers in which the cord cloth layers containing steel cords obliquely arranged at a relatively small angle with respect to the tire equatorial plane are so piled that the cords of the adjacent layers may be intersected with one another and a carcass composed of at least one rubberized cord cloth having cords arranged in substantially perpendicularly intersected with respect to the equatorial plane.

The heavy duty tires for use in trucks and buses employing steel cords as reinforcing elements for the belt and the carcass are used not only on fully-paved and well-conditioned good roads for instance a route for the exclusive use of motor vehicles such as expressway or the like but also on running roads partly including bad roads with an inferior road surface such as a construction road or the like.

In the former case, interlayer separation (BLB) of the belt layers is likely to occur due to running at high speeds while in the latter case, bursting, chipping and separation between the tread layer and a breaker layer, (TLB), are often developed from cuts at a time from running intermediate period to the running terminal period so that there are likely to cause problems with respect to abnormal shortening in the use life, impossibility of recapping and safety.

Tires aiming at preventing the problems in the latter case as much as possible are likely to produce the BLB which affects the performance required on the other hand on the good roads to cause the burst.

Further, when the conventional cords used in the tire of this kind are used in the belt layers in a form of a three layer twisted construction or two layer twisted construction containing steel filaments of less than 0.32 mm in filament diameter, the Young's modulus of the cords has been tried to be lowered by making the twisting pitch smaller so as to enhance the bad road performance. However, it has been proved that the durability performance (BLB resistant performance) at high speed running is lowered. Incidentally, in the case of the tire structure that the belt layer adjoining to the carcass ply among the belt layers is made hollow at the central portion thereof from the standpoint of the tire structure as having conventionally employed to enhance the bad road performance, it has been impossible to well overcome the defects of the radial tires for use on good roads containing at least partially bad roads, and has a problem that the durability is lowered.

Due to their large Young's modulus, the conventional steel cords have excellent good road performance but are poor in enveloping property (Ep). Thus, cuts are likely to be produced when treading projections such as gravels or pebbles. In order to eliminate such a defect, there has been examined a center hollow structure. In the case of the center hollow structure, the Ep property is improved at the central portion of the tire tread, whereas because the center hollow belt layer is present in the tire shoulder portion, the Ep property can not be improved and improving effect against cracks at belt edges on bad roads is small. Further, heat generation is large on the good road running due to small belt rigidity so that the BLB is likely to take place.

When the Young's modulus of the cords are simply lowered, there occurs the problem that while the bad road performance is enhanced, the durability in the good road performance is deteriorated due to its lowered belt rigidity as in the case of the center hollow structure [while the durability is not different in the case of bad roads with a bad road percentage of 40% due to the slow running speed, cracks are produced twice in the case of the good road (with a bad road percentage of 5%) including bad roads to deteriorate the durability. This is considered that since the speed factor becomes important, the heat generation increases and the crack-producing factor sensitivity depends upon the physical properties of cords.] The durability referred to here means the performance evaluated based on the cracks at the edge portion of the belt.

SUMMARY OF THE INVENTION

It is an object of the present invention to diminish the above problems of the prior art and to provide an improvement on the radial tires for use on good roads including at least partially bad road as running roads.

Further, it is another object of the present invention to improve the durability of the radial tire in running on good roads partially including bad roads, that is, improve the BLB resistance on the good road and the TLB resistance on the bad roads, through making rubber permeability more excellent and optimizing the stretch-arranged state of steel filaments by improving the tire reinforcing steel cords of the semi-good radial tire, thereby both attaining the performance on the good roads and the performance on the bad roads in combination, According to the present invention, there is a provision a radial tire having a combined reinforcement consisting of a belt composed of at least there piled cord layers with steel cords buried in parallel in rubber in which the cords in each of the layers are set at a relatively small angle with respect to a tire equatorial plane and the cords in at least one pair of the adjacent cord layers are intersectingly arranged at an angle from 15° to 30° and a carcass having cords arranged substantially at right angles with respect to the tire equatorial plane, wherein the steel cords buried in the at least one pair of the cord-intersecting cord layers other than the outermost cord layer have Young's modulus of 6,000 to 16,000 kg/mm$^2$ and a flexural rigidity of 150 to 250 g, and the initial stage elongation (P.L.E.) of the rubberized cords taken out from the tire is not more than 0.2%.

According to a preferred embodiment of the invention, there is a provision of the radial tire in which the Young's modulus of the steel cords used in the cord-intersecting cord layers is from 6,000 to 13,500 kg/mm$^2$.

According to another preferred embodiment of the present invention, there is a provision of the radial tire in which two layer twisted construction cords each having from two to four filaments of from 0.32 to 0.42 mm in diameter as a core are used in the cord-intersecting cord layers.

According to still another embodiment of the present invention, there is a provision of the radial tire which has the cord-intersecting cord layers in which the cords are buried in rubber at a buried cord internal of from 0.9 to 1.5 mm with the rubber occupying area percentage of 40 to 50%.

According to another aspect of the present invention, there is a provision of a tire reinforcing steel cord of a two layer twisted construction, composed of a core consisting of from two to four steel filaments and a single sheath consisting of a plurality of the steel filaments surrounding the core in which the steel filaments have a tensile strength of not lower than 260 kg/mm² and a filament diameter of from 0.32 to 0.42 mm; the twisting direction of the core is reversed to that of the sheath; the twisting angle of the sheath, P2, is $72° \leq P2 \leq 80°$ and the core twisting angle (P1) and the sheath twisting angle P2 meet the relation of $1.0 \leq P1/P2 \leq 1.1$.

According to a further preferred embodiment of the present invention, there is a provision of the tire reinforcing steel cord having a two layer twisted construction of 3+9, wherein the filament diameter (d) is in a range from 0.34 to 0.385 mm, and the lower limit $\underline{P2}$ and upper limit $\overline{P2}$ of the sheath twisting angle P2 meets the following formulae, respectively:

$\underline{P2} = 10.70d + 68.40$ $\overline{P2} = 17.86d + 72.40$

According to the still further preferred embodiment of the present invention, there is a provision of the tire reinforcing steel cord having the two layer twisted construction of 2+7, wherein the filament diameter (d) is in a range from 0.36 to 0.42 mm and the lower limit $\underline{P2}$ and upper limit $\overline{P2}$ of the sheath twisting angle P2 meet the following formulae, respectively:

$\underline{P2} = 10.70d + 68.15$ $\overline{P2} = 17.86d + 72.15$

According to a still further embodiment of the present invention, there is a provision of the tire reinforcing steel cord of a two layer twisted construction of 2+6, wherein the filament diameter (d) is in a range from 0.38 to 0.42 mm and the lower limit $\underline{P2}$ and upper limit $\overline{P2}$ of the sheath twisted angle P2 meet the following formulae, respectively:

$\underline{P2} = 17.86d + 71.90$ $\overline{P2} = 10.70d + 67.90$

According to a still further embodiment of the present invention, there is provision of the tire in reinforcing cord of a two layer twisted construction of 4+9, wherein the filament diameter (d) is in a range of from 0.335 to 0.38 mm and the lower limit $\underline{P2}$ and upper limit $\overline{P2}$ of the sheath twisting angle P2 meet the following formulae, respectively:

$\underline{P2} = 10.70d + 68.40$ $\overline{P2} = 17.86d + 72.40$

According to a still another aspect of the present invention, there is a provision of a radial tire having a combined reinforcement consisting of a belt composed of at least three piled cord layers with steel cords buried in parallel in rubber in which the cords in each of the layers are set at a relatively small angle with respect to a tire equatorial plane and the cords in at least one pair of the adjacent cord layers are intersectingly arranged at an angle from 15° to 30° and a carcass having cords arranged substantially at right angles with respect to the tire equatorial plane, wherein the steel cords buried in the at least one pair of the cord-intersecting cord layers other than the outermost cord layer have Young's modulus of 6,000 to 16,000 kg/mm² and a flexural rigidity of 150 to 250 g, and the initial stage elongation (P.L.E.) of the rubberized cords taken out from the tire is not more than 0.2% and said cord being a tire reinforcing steel cord of a two layer twisting construction composed of a core consisting of from two to four steel filaments and a single sheath consisting of a plurality of the steel filaments surrounding the core in which the steel filaments have a tensile strength of not lower than 260 kg/mm² and a filament diameter of from 0.32 to 0.42 mm; the twisting direction of the core is reversed to that of the sheath; the twisting angle of the sheath, P2, is $72° \leq P2 \leq 80°$ and the core twisting angle (P1) and the sheath twisting angle P2 meet the relation of $1.0 \leq P1/P2 \leq 1.1$.

These and other objects, features and advantages of the invention will be well appreciated upon reading of the following description of the invention when taken in connection with the attached drawings with understanding that some modifications, variations and changes of the same could be easily contrived by the skilled in the art to which the invention pertains without departing from the spirit of the invention or the scope of the claims appended hereto.

BRIEF DESCRIPTION OF THE DRAWINGS

For better understanding of the invention, reference is made to the attached drawings wherein.

DETAILED DESCRIPTION OF THE INVENTION

Upon having various studies to utilize both the bad road performance and good road performance with respect to radial tire for use on semi-good roads including at least partially bad rods in running, the present inventors have found that to increase the bad road performance is to relatively soften the tread center portion of the tire, while to enhance the good road performance is to lessen the movement of the end portion of the belt cords, and that both the performances can be attained tread that while the bad road performance is enhanced by the Young's modulus of the cords, the good road performance is enhanced by increasing the flexural rigidity of the cords and making smaller the initial stage elongation.

According to the tire of the present invention, with the Young's modulus being lowered, the Ep property of the tire is improved and the tread cut resistance (hereinafter briefly referred to as "cut resistance") as the requisite performance in the bad road running is enhanced, whereas the good road performance which is deteriorated by the lowered Young's modulus is enhanced by increasing the flexural rigidity and lowering the initial stage elongation, thereby attaining both the good road performance and the bad road performance in consistence and further overcoming the defects possessed by the center hollow structure. Thus, the Young's modulus, the initial stage elongation (P.L.E.) and the flexural strength of the steel cords buried in the two cord-intersecting cord layers other than the outermost cord layer in the belt are required to be set at 6,000–16,000 kg/mm$^2$, preferably from 6,000 to 13,500 kg/mm$^2$, not more than 0.2%, and from 150 to 250 g, respectively.

Young's modulus, initial stage elongation, and flexural rigidity were measured and evaluated in the following manners.

YOUNG'S MODULUS

The Young's modulus is a value obtained through dividing the gradient ($\theta$) of a tangent of an elongation-load curve (S-S curve) at 30 kg loading by the cord occupying area which is a value obtained by multiplying the sectional area $[\pi(d/2)^2]$ determined from the filament diameter d measured by means of a micrometer by the number of the filaments, while the section of the filaments constituting the cords being approximated as a circle.

INITIAL STAGE ELONGATION

The initial stage elongation (P.L.E.) is the elongated amount during loading from 0.25 kg to 5 kg when a rubberized cord is pulled by means of a tensile tester.

FLEXURAL RIGIDITY

The flexural rigidity is measured by the following way.

Figure 7A:
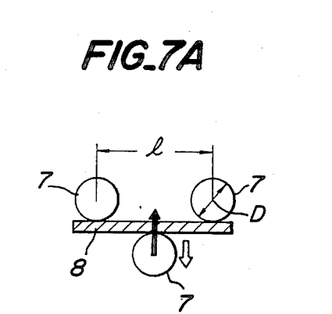
FIG. 7(A) is an illustrative view of a measuring way of the flexural regidity.
Figure 7B:
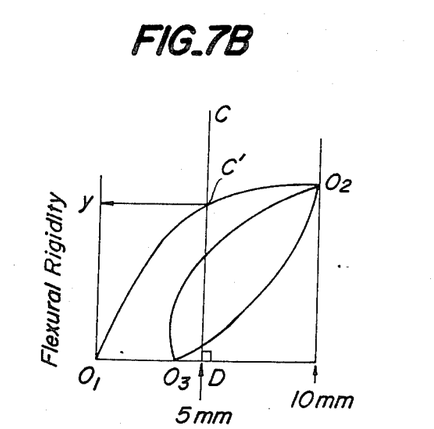
FIG. 7(B) is an elongation load curve diagram showing the measured results of the flexural rigidity.
Figure 8A:
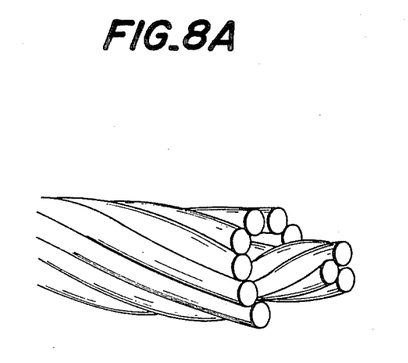
FIGS. 8(A), 9(A), 10(A) and 11(A) are partially perspective views of embodiments of the steel cord according to the present invention having two layer twisted constructions of 3+9, 4+9, 2+7 and 2+6, respectively.
Figure 8B:
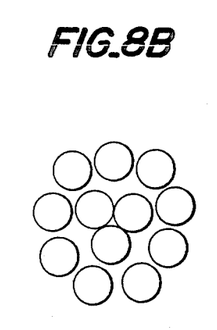
FIGS. 8(B), 9(B), 10(B) and 11(B) are sectional views of the steel cords shown in FIGS. 8(A), 9(A), 10(A) and 11(A), respectively.
Figure 8C:
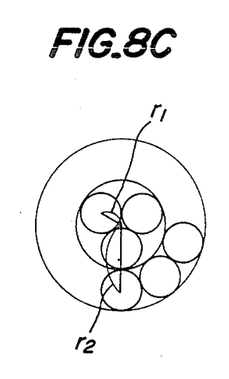
FIGS. 8(C), 9(C), 10(C) and 11(C) are sectional views of FIGS. 8(B), 9(B), 10(B) and 11(B) schematically showing r₁ and r₂, respectively.

That is, as shown in FIG. 7(A), a rubberized cord 8 is stretched among three point pulleys 7 [the diameter (D) and the distance (l) of the pulleys are 20 mm and 70 mm, respectively], and the center pulley is moved in the arrow directions to obtain an S-S curve ($O_1$-$O_2$) as shown in FIG. 7(B). When the displacement reaches 10 mm, the center pulley is returned in a reverse direction to obtain curve ($O_2$-$O_3$-$O_1$). Next, when the center pulley is moved by 10 mm in the arrow direction to obtain a curve ($O_1$-$O_3$-$O_2$). An intersection C' is obtained between a straight line DC perpendicularly erected at the displacement of 5 mm on the abscissa and the hysteresis curve ($O_1$-$O_2$). The y coordinate of the point C' is the flexural rigidity. The larger the y coordinate, the higher the rigidity.

It is preferable that the interval of the buried cords and the rubber occupying area percentage are from 0.9–1.5 mm and from 40 to 50%, respectively. The rubber occupying area percentage and the cord buried interval can be calculated by the following formulae;

Rubber occupying area percentage =
[50 mm − cord diameter (mm) × end count]/50 mm
Cord buried interval =
50 mm/end count − cord diameter (mm)

In the above formulae, the end count means the number of the cords per 50 mm at the center portion of the tire tread, and the cord diameter means the one excluding the spiral portion. When the rubber occupying area percentage and the cord buried interval are determined from the above formulae, the optimum cord diameter is accordingly determined.

Therefore, if the buried cord interval is too narrow, cracks are readily continued to those of the adjacent cords, while if the interval is too wider, unfavorably stress is likely to be too concentrated around a cord to make the length of the cracks at the end portion of the cord longer. Thus, the buried cord interval is preferably in the above range from 0.9 to 1.5 mm. Even when the cords are buried at the above interval, if the rubber occupying area percentage is smaller, the cord diameter inherently becomes thicker. That is, the filament diameter of the cords becomes larger so that the cords are likely to be fatigued and cut and the weight of the tire becomes increases. To the contrary, when the rubber occupying area percentage becomes larger, the tread cut resistance is improved, but the cord diameter becomes smaller. That is, the diameter of the filament becomes smaller so that the flexural rigidity of the cords becomes smaller to lower the cord flexural rigidity and the cracks are increased. Thus, the rubber occupying area percentage is preferably in a range from 40 to 50%.

As the cords used in the intersecting cord layers in the belt, it is preferable to employ twisted cords having a two layer twisted construction in which from two to four filaments of 0.32 to 0.42 mm in diameter are combined into two layers. The reason therefore is that the two layer twisted construction is more advantageous to increase the good road performance (durability) with the buried cord interval (as requirement from the cracking characteristics) and the rubber occupying area percentage (as requirement from the cord cut resistance) being restricted. That is, since the flexural rigidity is in proportion to four power of the filament diameter, if the cords are of the three layer twisted construction, the filament diameter becomes smaller to extremely lower the durability.

Therefore, good results are obtained by using metal cords of the two layer twisted construction employing the filaments having the filament diameter of 0.32 to 0.42 mm which is thicker than the conventional ones and two to four filaments as the core for the cords in the inersecting belt layers, specially, the metal cords of the two layer twisted constructions of 2+6, 2+7, 3+8, 3+9, 4+9, 4+11, etc.

The first aspect of the invention will be explained with reference to the following Examples and Comparative Examples. It should be understood that the following Examples are merely given to be illustrative of the invention, but never interpreted to limit the scope of the invention.

Figure 1:
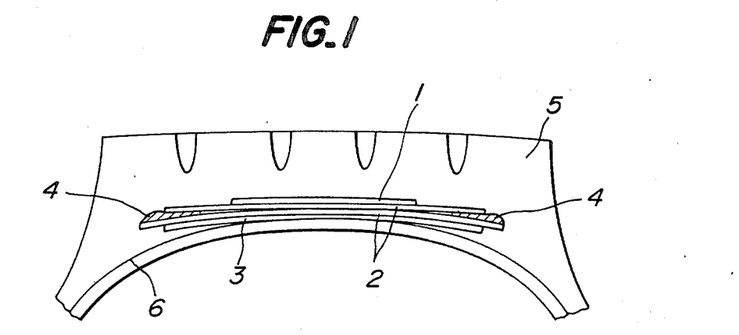
FIGS. 1-3 are embodiments of the tire according to the present invention including a tread portion.
Figure 2:
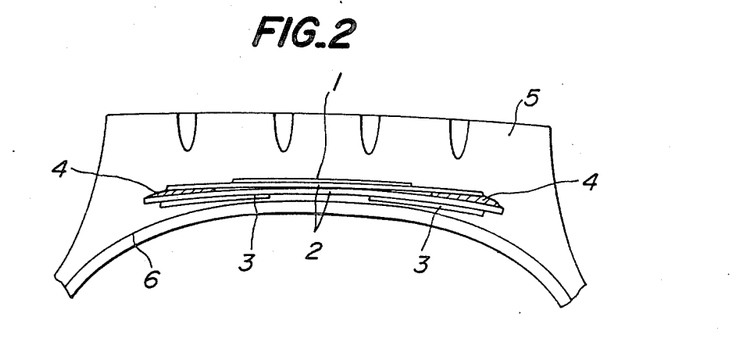
Figure 3:
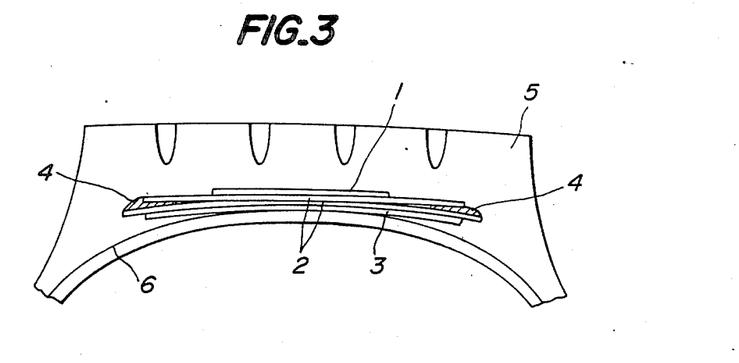

Examples 1–9 and Comparative Examples 1–10:

11.00R-20 radial tires for truck and bus of A type, B type and C type with the tread portions as shown in FIGS. 1, 2, and 3, respectively, were prepared. In FIG. 1, the belt construction of the tires is so designed that the angle of the steel cords of a first belt layer 3 first arranged from the carcass ply 6 is 52° with respect to the tire circumferential direction; the steel cords of the second belt layer 2 and the third belt layer 2 superimposed upon the first belt layer 3 are intersected with one another at the tire circumferential direction angle of 28°; and the steel cords of a fourth belt layer 1 superimposed upon the intersecting belt layers are arranged at 28° with respect to the tire circumferential direction.

Reference numerals 4 and 5 are a sheet rubber disposed between the intersecting belt layers 2, 2 and a tread, respectively. The 100% modulus of this rubber is 60 kg/cm².

The belt construction of FIG. 2 is a center hollow belt structure in which the first belt layer 3 is made hollow at the central portion thereof. The angle of the steel cords in the first belt layer 3 is 52° in the tire circumferential direction; and the second belt layer 2 and the third belt layer 2 and the fourth belt layer 1 are the same as in FIG. 1. The 100% modulus of the sheet rubber 4 is 60 kg/cm².

FIG. 3 is different from the tire in FIG. 1 only in that soft rubber having 100% modulus being 30 kg/cm² is used as the sheet rubber 4.

Table 1 shows tires of typical Examples and Comparative Examples.

With respect to these test tires, they were actually run over 70,000 km on semi-good roads including 5% bad roads under a 100% loading, and the following characteristics were evaluated.

CUT RESISTANCE

The tread of the tire after the actual running was peeled off above the outermost cord layer of the belt, and the number of cuts reaching the outermost cord layer is determined.

The cut resistance is so indicated based on the number of cuts by index that the larger the index, the more excellent in the cut resistance. The cut resistance is indicated by index, taking the value of the tire in Comparative Example 3 as 100.

DURABILITY (CRACK LENGTH)

The tire after the actual running was decomposed and the length of cracks at an end portion of the third belt cords layer was measured to make evaluation. That is, the tread was peeled off above the cords of the third belt layer to expose the end portion of the cords of the third belt layer, and the length of cracks occured along the cords were measured by means of vernier callipers. The durability was shown by index, taking the value of the tire in Comparative Example 3 at 100.

TABLE 1 (a)

| | Example | | | | | | | | |
|---|---|---|---|---|---|---|---|---|---|
| | 1 | 2 | 3 | 4 | 5 | 6 | 7 | 8 | 9 |
| Tire construction | A type | A type | A type | A type | A type | A type | B type | B type | C type |
| Cord construction | 3 + 9 × 0.36 6S/12Z | 3 + 9 × 0.36 9S/18Z | 4 + 9 × 0.36 7S/14Z | 2 + 7 × 0.38 7S/14Z | 1 × 12 × 0.36 18S | 1 × 12 × 0.36 20S | 3 + 9 × 0.36 6S/12Z | 1 × 12 × 0.36 24S | 3 + 9 × 0.38 6S/12Z |
| Young's modulus (kg/mm²) | 12,800 | 13,500 | 13,000 | 13,400 | 13,000 | 13,700 | 12,800 | 15,000 | 12,800 |
| Flexural rigidity (g) | 175 | 195 | 192 | 160 | 175 | 180 | 175 | 190 | 175 |
| P.L.E. (%) | 0.14 | 0.12 | 0.16 | 0.15 | 0.18 | 0.12 | 0.14 | 0.10 | 0.14 |
| Buried cord internal | 1.21 | 1.21 | 1.19 | 1.20 | 1.25 | 1.25 | 1.21 | 1.25 | 1.21 |
| Rubber occupying area percentage (%) | 45.0 | 45.0 | 44.2 | 49 | 46.4 | 46.4 | 45.0 | 46.4 | 45.0 |
| Cut resistance | 112 | 108 | 110 | 112 | 112 | 108 | 132 | 126 | 112 |
| Durability | 132 | 153 | 147 | 118 | 123 | 137 | 107 | 121 | 142 |

TABLE 1 (b)

| | Comparative Example | | | | | | | | | |
|---|---|---|---|---|---|---|---|---|---|---|
| | 1 | 2 | 3 | 4 | 5 | 6 | 7 | 8 | 9 | 10 |
| Tire construction | A type | A type | A type | A type | A type | A type | A type | A type | B type | A type |
| Cord construction | 4 × 4 × 0.23 4S/6S | 1 × 12 × 0.34 24S | 3 + 9 + 15 × 0.23 + 1 | 3 + 9 + 15 × 0.23 + 1 | 3 + 9 × 0.36 6S/12S | 3 + 9 × 0.36 6S/12Z | 3 + 9 × 0.28 7S/14Z | 3 + 9 × 0.43 9S/18Z | 3 + 9 + 15 × 0.23 + 1 | 3 × 0.20 + 6 × 0.38 9.5S/14.0Z |
| Young's modulus (kg/mm²) | 4,000 | 16,500 | 16,000 | 11,000 | 12,500 | 12,800 | 14,000 | 12,500 | 16,000 | 18,000 |
| Flexural rigidity (g) | 13 | 159 | 125 | 115 | 170 | 175 | 65 | 360 | 125 | 122 |
| P.L.E. (%) | 0.8 | 0.10 | 0.10 | 0.18 | 0.30 | 0.14 | 0.11 | 0.18 | 0.10 | 0.08 |
| Buried cord internal | 1.21 | 1.21 | 1.28 | 1.28 | 1.20 | 2.4 | 1.10 | 1.33 | 1.28 | 0.61 |
| Rubber occupying area | 45.0 | 46.0 | 48.0 | 48.0 | 44.8 | 62.0 | 48.5 | 42.6 | 48.0 | 34.0 |

TABLE 1 (b)-continued

| | Comparative Example | | | | | | | | | |
|---|---|---|---|---|---|---|---|---|---|---|
| | 1 | 2 | 3 | 4 | 5 | 6 | 7 | 8 | 9 | 10 |
| percentage (%) | | | | | | | | | | |
| Cut resistance | 164 | 93 | 100 | 126 | 114 | 130 | 108 | 104 | 140 | 80 |
| Durability | 40 | 122 | 100 | 90 | 75 | 82 | 76 | 210 | 80 | 80 |

Examples 1, 2, 3, 4, 5 and 6 are of the cord constructions of 3+9×0.36, 4+9×0.36, 2+7×0.38, and 1×12×0.36, respectively, and the bad road performance and the good road performance are both improved.

Examples 7 and 8 are tires each combined with the center hollow structure. It is seen that durability which is defect in the center hollow structure is fully complemented.

Example 9 is a tire combined with soft rubber. The durability is further improved, that is, cracks at the edge portion of the third belt layer is further lessened (the 100% modulus is 30 kg/cm² being the half of that of the belt coating rubber).

Comparative Example 1 is an example having a high elastic coefficient (HEC) in which the Young's modulus is extremely lowered. Although the cut resistance is enhanced, the durability (length of the cracks at the edge portion of the third belt layer) is extremely deteriorated.

Comparative Example 2 is cords having the increased Young's modulus, but the cut resistance is not improved.

Comparative Example 3 is an example of the three layer twisted cord construction in which the filament diameter becomes thinner, the flexural rigidity becomes smaller and the Young's modulus is large from the requirement of the buried cord interval and the rubber occupying area percentage. Thus, the cut resistance and the durability are not improved.

Comparative Example 4 is an example of lowered Young's modulus cords in which the pitch of the three layers is made dense. Although the cut resistance is improved due to the lowered Young's modulus, the durability (length of cracks at the edge portion of the third belt layer) is further deteriorated.

Comparative Example 5 is an example of 3+9×0.36 cords in which the initial stage elongation becomes larger due to the S-S twisting. Since the initial stage elongation is large, the durability is not almost improved.

Comparative Example 6 is an example in which the buried cord interval is wide. Although the cut resistance is improved, the durability is deteriorated.

Comparative Example 7 is an example in which cords has the two layer twisted construction and the flexural rigidity is small. That the flexural rigidity is small in the case of the two layer twisted construction means that the filament diameter is inherently small, and thereby the durability is deteriorated.

Comparative Example 8 is an example reverse to Comparative Example 7. Since the larger filament diameter gives the larger flexural rigidity, the cut resistance and the durability are both excellent. However, the fatigue characteristics are extremely deteriorated so that the cords are likely to be cut and produce burst.

Comparative Example 9 is an example in which the three layer twisted construction is combined with the center hollow construction. Since the flexural rigidity is also small, the durability is poor.

Comparative Example 10 is an example of a two layer twisted construction in which the flexural rigidity is small and the buried cord interval is small. The cut resistance is poor and the durability is low. Since the buried cord interval is small, the cracks are likely to be continued to the adjacent ones.

The reason why there is no example having the initial stage elongation (P.L.E.) being not more than 0.05% is that cords with such elongation can not be actually produced from the standpoint of the cord manufacturing (some spacing is inevitably formed between filaments). P.L.E. is not singly extremely made larger. In that case, the twisting pitch must be made dense to inevitably lower the Young's modulus.

Figure 4:
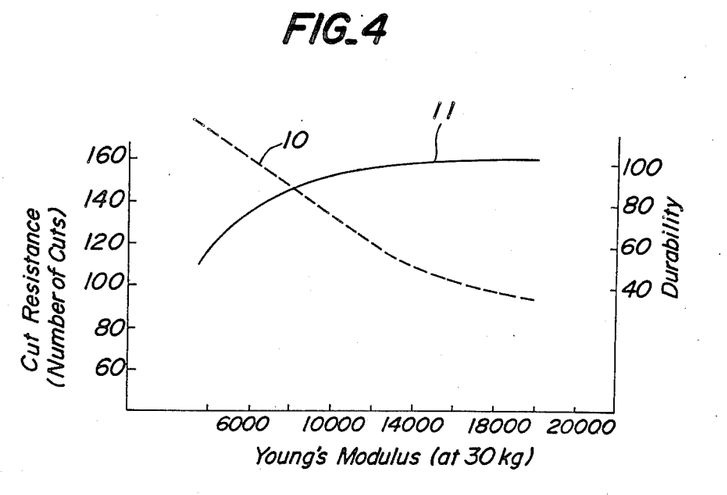
FIG. 4 is a curve diagram showing the relation between Young's modulus and cut resistance or durability.
Figure 5:
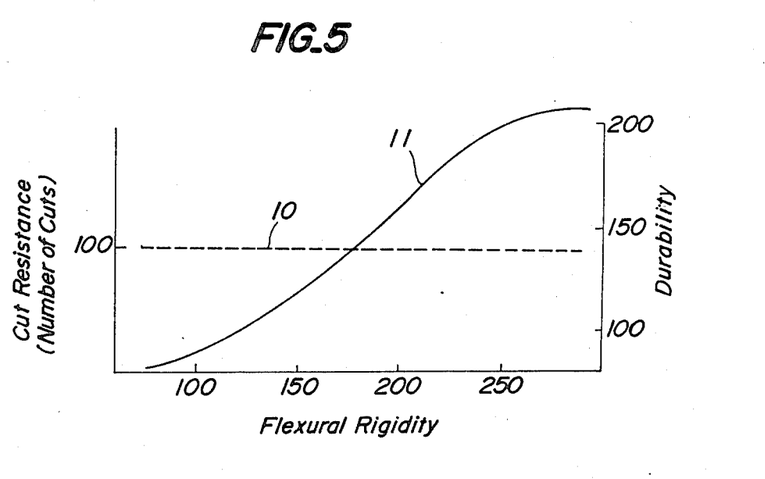
FIG. 5 is a diagram showing the relation between flexural rigidity and cut resistance or durability.
Figure 6:
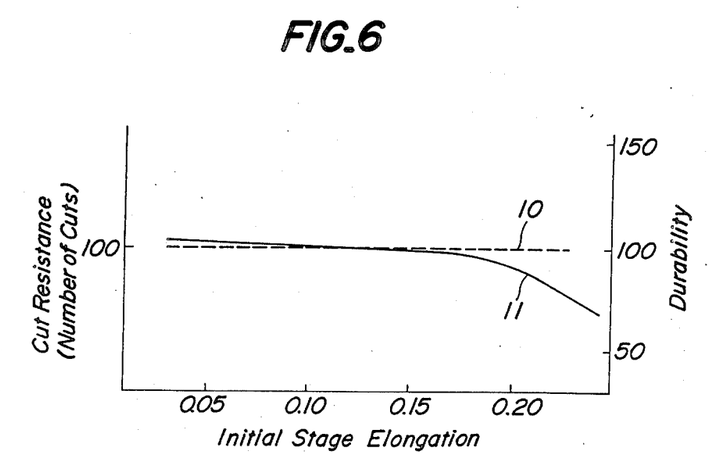
FIG. 6 is a curve diagram showing the relation between the initial stage elongation and cut resistance or durability.

Further, the whole results obtained in Experimental examples are shown in FIGS. 4, 5 and 6. FIG. 4 shows the relation between the Young's modulus (kg/mm²) and the cut resistance (numer of cuts) or durability (BLB resistance) of the belt cords in the intersecting belt layers. In these figures, lines 10 and 11 show the cut resistance and the durability, respectively. When the Young's modulus of the belt cords is increased, it is likely that the durability is improved but the cut resistance is decreased. Even if the Young's modulus is made higher than a certain value, the effect of enhancing the durability becomes saturated. On the other hand, if the Young's modulus of the belt cords is lowered, the cut resistance is improved but the durability becomes lower.

Therefore, Young's modulus of the belt cords is preferably from 6,000 to 16,000 kg/cm², more preferably from 6,000 to 13,500 kg/cm².

FIG. 5 shows the relation between the flexural rigidity (g) and the cut resistance (number of cuts) or the durability (BLB property) of the belt cords of the intersecting belt layers. If the flexural rigidity is more than a given value, there is a tendency that the cut resistance is not varied, while the durability is improved with the increase in the flexural rigidity. With the increase in the flexural rigidity, the durability becomes higher to be likely to be converged into a specific value. Therefore, the durability is preferably set at less than 250 g. If the flexural rigidity is lowered, the durability is decreased. If the flexural rigidity is lowered to less than 150 g, the local wear is unfavorably produced in the tread.

FIG. 6 shows the relation between the initial stage elongation (P.L.E) and the cut resistance (number of cuts) or the durability (BLB property) of the belt cords. When the P.L.E. is not less than 0.20, excellent durability can not be unfavorably obtained.

As described hereinbefore, according to the radial tire of the present invention, the Young's modulus and the flexural rigidity of the steel cords buried into the intersecting belt cord layers other than the outermost cord layer of the belt consisting of at least three layers are set from 6,000 to 16,000 kg/mm² and from 150 to 250 g, respectively. The initial stage elongation (P.L.E.)

of the cords in the rubberized state taken out from the tire is set in the range of not more than 0.2%. Thereby, the invention has the effects that the durability required in running on the semi-good road including bad roads is improved, and the bad road performance, that is, the cut resistance required in the bad road, and the good road performance, that is, the durability required in the good road can be both realized.

Next, another aspect of present invention will be explained.

As mentioned above, upon having made various studies upon the semi-good radial tires for use on roads including at least partially bad roads so as to attain both the bad road performance and the good road performance, it has been found out that both the performance can be attained by improving the bad road performance through lowering Young's modulus of the cords, while the good road performance is improved by increasing the flexural rigidity and lessening the initial stage elongation. The following aspect of the present invention is aimed at the cord construction of such a radial tires on the basis of another point of view.

The tire reinforcing steel cord according to the present invention has the two layer twisted construction in which a core is surrounded by a single sheath. If the desired low Young's modulus and high flexural rigidity are intended to be obtained by three layer twisted construction, while the cord diameter becomes extremely larger, the weight becomes largely increased, and the rolling resistance becomes deteriorated. Further, input of the filament increases to deteriorate fatigue resistance. On the other hand, in the case of the single layer twisted construction with the same buried cord interval, the belt rigidity becomes smaller to lower the wear resistance, while when the end count is increased, the bad road performance becomes lowered.

The reason why the range of the filament diameter is limited to a range of 0.32 to 0.42 mm is that in the case of the two layer twisted construction the filament diameter is less than 0.32 mm, the BLB is not so improved but the local wear resistance is deteriorated, while when the filament diameter exceeds 0.42 mm, the increased input upon the filament is induced and the cord fatigue resistance becomes deteriorated.

The total belt strength is required to have more than a certain value from the standpoint of safety designing of the tire. But, by setting the tensile strength of the filaments at not less than 260 kg/mm$^2$, the end count can be reduced, and the tread cut resistance is improved with the tire weight being reduced. On the other hand, if the tensile strength is less than 260 kg/mm$^2$, the buried cord interval becomes narrower, so that the tread cut resistance is lowered, cracks are extremely readily continued, and the durability becomes deteriorated.

According to the present invention, the twisting direction of the core is reversed to that of the sheath. By reversely twisting in such a manner, the rubber permeablity becomes more excellent. Even if cut is formed in the intersecting layers, water is difficult to invade. Therefore, the length of poor adherence between the cords and the rubber coming from the water invasion, that is, the length of separation becomes shorter, so that burst is unlikely to occur and the durability is improved.

The present invention specifies the twisting angles of the sheath and the core. It is specified that the twisting angle (P2) of the sheath meets $72° \leq P2 \leq 80°$, and the ratio between the core twisting angle (P1) and the sheath twisting angle (P2) meets the relation of $1.0 \leq P1/P2 \leq 1.1$. This is because if the sheath twisting angle P2 is less than 72°, the initial stage elongation becomes larger, and the Young's modulus of the steel cords becomes smaller to largely reduce the durability (BLB resistance), while if $P2>80°$, the Young's modulus of the steel cords becomes too higher as much as not less than 13,500 kg/mm$^2$ so that the tread cut property (TLB resistance) can not be unfavorably enhanced. If the ratio of P1/P2 is less than 1.0 or more than 1.1, the stress is applied ununiformly upon the core and the sheath, so that the core and the sheath are separately broken to remarkably lower the cord strength.

When the ratio is $1.0 \leq P1/P2 \leq 1.1$, the efficiency of stretchingly arranging the steel filaments can be obtained and the maximum cord strength can be attained.

The filament diameter d and the sheath twisting angle P2 are determined with respect to the respective cord constructions as follows:

| Cord construction (Number of filaments of core + number of filaments of sheath) | Filament diameter | Lower limit of P2 ($\underline{P2}$) | Upper limit of P2 ($\overline{P2}$) |
|---|---|---|---|
| 4 + 9 | d = 0.335–0.380 mm | $\underline{P2}$ = 10.70 d + 68.40 | $\overline{P2}$ = 17.86 d + 72.40 |
| 3 + 9 | d = 0.340–0.385 mm | $\underline{P2}$ = 10.70 d + 68.40 | $\overline{P2}$ = 17.86 d + 72.40 |
| 2 + 7 | d = 0.360–0.420 mm | $\underline{P2}$ = 10.70 d + 68.15 | $\overline{P2}$ = 17.86 d + 72.15 |
| 2 + 6 | d = 0.380–0.420 mm | $\underline{P2}$ = 17.86 d + 71.90 | $\overline{P2}$ = 10.70 d + 67.90 |

The reason why the filament diameter has the upper and lower limits in the case of the cord constructions of 4+9, 3+9, 2+7 and 2+6 is that if the filament diameter becomes smaller than the corresponding lower limit, the desired flexural rigidity can not be maintained, the durability is not so improved and the local wear is feared, while if the filament diameter exceeds the upper limit, the filament input becomes larger to lower the fatigue resistance. Further, if P2 is less than the above corresponding lower limit, the initial stage elongation (P.L.E.) becomes larger, and the Young's modulus becomes lower. Consequently, the BLB resistance becomes lower. If the P2 exceeds the above corresponding upper limit, the Young's modulus of the cords becomes more than 13,500 kg/mm$^2$ and the tread cut resistance becomes lowered.

With respect to a radial tire reinforced by a belt composed of at least two piled rubberized cord cloth layers which are intersected with each other such that cords are inclinedly arranged at a relatively small angle with reference to the tire equatorial plane and a carcass composed of at least one rubberized cord cloth layer in which cords are arranged intersecting with the tire equatorial plane at substantially right angles, the steel cords of a low Young's modulus (6,000–13,500 kg/mm$^2$) and a high flexural rigidity (150 g–200 g) can be obtained by adopting the steel cords of the two layer twisted construction in which the filament diameter is in a range of 0.32 to 0.42 mm, and the sub-good radial tire with improved bad road performance and good road performance can be obtained by adopting the belt layers in which the steel cords are intersected with one another.

Next, the second aspect of the present invention will be explained by way of example with reference to the following Examples, Comparative Examples and the drawings.

FIGS. 8(A), 9(A), 10(A) and 11(A) show embodiments of the tire reinforcing steel cords of the two layer twisted construction according to the present invention. FIGS. 8(B), 9(B), 10(B) and 11(B) show the corresponding sectional views of the steel cords shown in FIGS. 8(A), 9(A), 10(A) and 11(A), respectively.

Filament diameter, pitch, twisting angle, P1/P2 and tensile strength are given to the steel cords of the two layer twisted constructions as shown in Table 2, and measured values of the physical properties of the steel cords are also shown as Examples in Table 2. Further, physical properties of steel cords in which the cord construction is the same as in the present invention but the filament diameter is deviated from the range of the invention and those in which the construction itself differs from those of the present invention are also shown as Comparative Examples in Table 2.

Figure 9A:
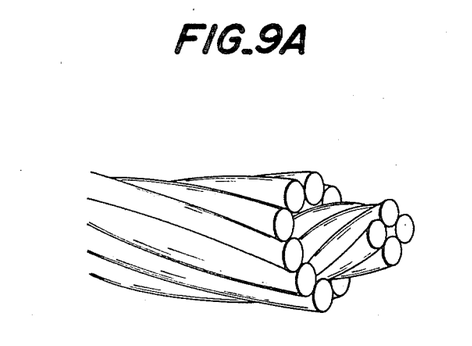
Figure 9B:
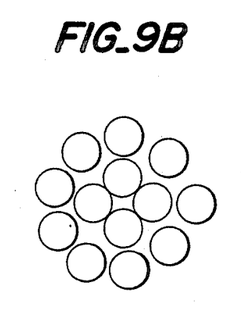
Figure 9C:
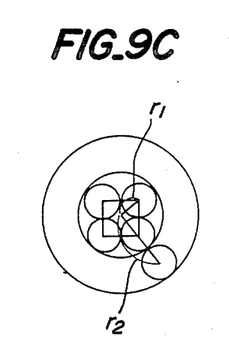
Figure 10A:
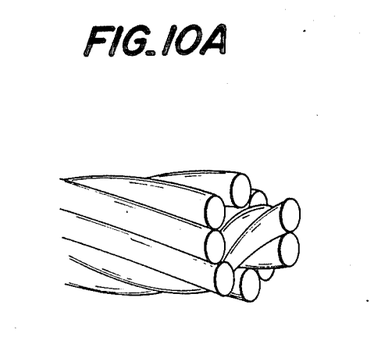
Figure 10B:
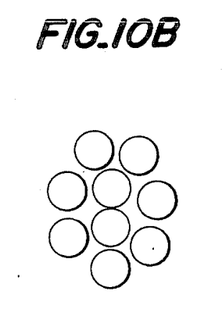
Figure 10C:
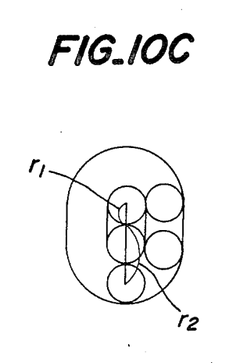
Figure 11A:
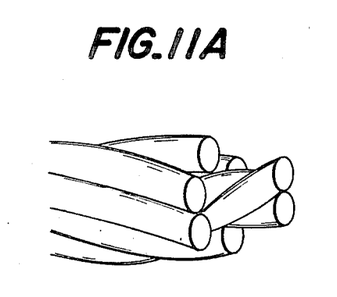
Figure 11B:
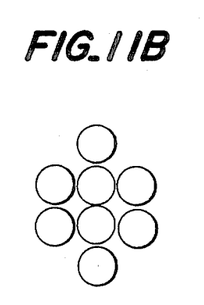
Figure 11C:
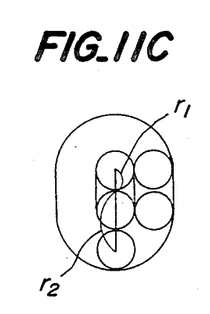
Figure 12:
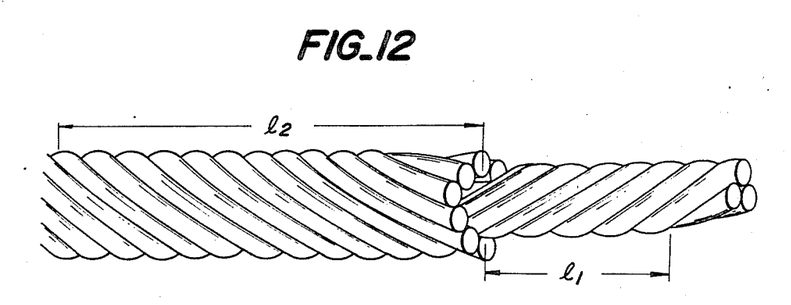
FIG. 12 is a partially perspective view of a steel cord according to the present invention showing one pitch of a core and a sheath.

After the $r_1$ and $r_2$ shown in FIGS. 8(C), 9(C), 10(C) and 11(C) and $l_1$ and $l_2$ shown in FIG. 9 are actually measured, the twisting angles P1 and P2 are calculated from the following formulae:

$$\tan P1 = \frac{l_1}{2\pi r_1}$$

$$\tan P2 = \frac{l_2}{2\pi r_2}$$

The $l_1$ and $l_2$ shows the pitch lengths of the core and the sheath, respectively.

Values of the physical properties shown in Examples 10-14 and Comparative Examples 11-13 were determined as mentioned in connection with Examples 1-9 and Comparative Examples 1-10.

Comparative Example 1 is an example having the cord construction of 3+9×0.28. Since the filament diameter is smaller, the flexural rigidity becomes lower and the BLB resistance (durability) is deteriorated.

Comparative Example 2 is an example having the cord construction of 3+9×0.43. The filament diameter is large and the filament input is increased so that the fatigue resistance is deteriorated and the cords are likely to be cut.

Comparative Example 3 is an example of cords currently used in which the Young's modulus is high and the flexural rigidity is small so that there is problems with respect to the tread cut resistance and the durability.

As mentioned in the foregoing, according to the tire reinforcing steel cords of the present invention, by using the steel filaments having a tensile strength of not less than a specified value and a filament diameter of a specified diameter and forming them into the two layer twisted construction, while the rubber permeability is improved and the stretching arrangement state of the steel filaments is optimized by specifying the twisting direction and the twisting angle. Thereby, the durability of the radial tire using such steel cords of the radial tires running on the sub-good roads can be improved, and thereby effects of attaining both the bad road performance and the good road performance can be obtained.

What is claimed is:

1. A radial tire having a combined reinforcement consisting of a belt composed of at least three piled cord layers with steel cords buried in parallel in rubber in which the cords in each of the layers are set at a relatively small angle with respect to a tire equatorial plane and the cords in at least one pair of the adjacent cord layers are intersectingly arranged at an angle from 15° to 30° and a carcass having cords arranged substantially at right angles with respect to the tire equatorial plane, wherein the steel cords buried in the at least one pair of the cord-intersecting cord layers other than the outermost cord layer have Young's modulus of 6,000 to

TABLE 2

| | Example | | | | | Comparative Example | | |
|---|---|---|---|---|---|---|---|---|
| | 10 | 11 | 12 | 13 | 14 | 11 | 12 | 13 |
| Cord construction | 3 + 9 × 0.36 | 3 + 9 × 0.36 | 4 + 9 × 0.36 | 2 + 7 × 0.38 | 2 + 6 × 0.40 | 3 + 9 × 0.28 | 3 + 9 × 0.43 | 3 + 9 + 15 × 0.23 + 1 |
| Pitch (core/sheath) | 6S/12Z | 9S/18Z | 7S/14Z | 7S/14Z | 8S/16Z | 7S/14Z | 9S/18Z | 6S/12S/18Z/35S |
| Twisting angle | | | | | | | | |
| P1 | 77.72 | 81.74 | 77.13 | 80.32 | 81.07 | 81.74 | 80.17 | — |
| P2 | 73.44 | 78.79 | 74.58 | 75.65 | 76.74 | 78.79 | 76.68 | — |
| P1/P2 | 1.058 | 1.037 | 1.034 | 1.062 | 1.056 | 1.037 | 1.046 | — |
| Tensile strength | 320 | 320 | 320 | 270 | 265 | 300 | 260 | 305 |
| Young's modulus (kg/mm²) | 12800 | 13500 | 13000 | 13400 | 13000 | 14000 | 12500 | 16000 |
| Flexural rigidity (g) | 175 | 195 | 192 | 160 | 175 | 65 | 360 | 125 |
| P.L.E. (%) | 0.14 | 0.12 | 0.16 | 0.15 | 0.12 | 0.11 | 0.18 | 0.10 |
| Tread cut resistance | 112 | 108 | 110 | 112 | 110 | 108 | 104 | 100 |
| BLB resistance (durability) | 132 | 153 | 147 | 118 | 138 | 76 | 210 | 100 |

Examples 1 and 2 are examples having the cord construction of 3+9×0.36 and Examples 3, 4 and 5 are examples having the cord constructions of 4+9×0.36, 2+7×0.38, and 2+6×0.40, respectively. The bad road performance and the good road performance of all these examples are improved.

16,000 kg/mm² and a flexural rigidity of 150 to 250 g, and the initial stage elongation (P.L.E.) of the rubberized cords taken out from the tire is not more than 0.2% and said cord being a tire reinforcing steel cord of a two layer twisted construction composed of a core consisting of from two to four steel filaments and a single sheath consisting of a plurality of the steel filaments surrounding the core wherein the steel filaments have a tensile strength of not lower than 260 kg/mm$^2$ and a filament diameter from 0.32 to 0.42 mm; the twisting direction of the core is reversed to that of the sheath; the twisting angle of the sheath, P2, is $72° \leqq P2 \leqq 80°$ and the core twisting angle P1 and the sheath twisting angle P2 meet the relation of $1.0 \leqq P1/P2 \leqq 1.1$.

2. A radial tire according to claim 1, wherein the Young's modulus of the steel cords used in the cord-intersecting cord layers is from 6,000 to 13,500 kg/mm$^2$.

3. A radial tire according to claim 1, which has the cord-intersecting cord layers in which the cords are buried in rubber at a buried cord internal of from 0.9 to 1.5 mm with the rubber occupying area percentage of 40 to 50%.

4. A tire according to claim 1, wherein said reinforcing cord has a two layer twisted construction of 3+9, and the filament diameter (d) is in a range from 0.34 to 0.385 mm, and the lower limit $\underline{P2}$ and upper limit $\overline{P2}$ of the sheath twisting angle P2 meets the following formulae, respectively:

$\underline{P2} = 10.70d + 68.40$ $\overline{P2} = 17.86d + 72.40$

5. A tire according to claim 1, wherein said reinforcing cord has the two layer twisted construction of 2+7, and the filament diameter (d) is in a range from 0.36 to 0.42 mm and the lower limit $\underline{P2}$ and upper limit $\overline{P2}$ of the sheath twisting angle P2 meet the following formulae, respectively:

$\underline{P2} = 10.70d + 68.15$ $\overline{P2} = 17.86d + 72.40$

6. A tire according to claim 1, wherein said reinforcing cord has a two layer twisted construction of 2+6, and the filament diameter (d) is in a range from 0.38 to 0.42 mm and the lower limit $\underline{P2}$ and upper limit $\overline{P2}$ of the sheath twisted angle (P2) meet the following formulae, respectively;

$\underline{P2} = 17.86d + 71.90$ $\overline{P2} = 10.70d + 67.90$

7. A tire in according to claim 1, wherein said reinforcing cord has a two layer twisted construction of 4+9, and the filament diameter (d) is in a range from 0.335 to 0.38 mm and the lower limit $\underline{P2}$ and upper limit $\overline{P2}$ of the sheath twisting angle P2 meet the following formulae, respectively:

$\underline{P2} = 10.70d + 68.40$ $\overline{P2} = 17.86d + 72.40$

* * * * *